J. MASSEY.

Grain Drier.

No. 328

Reissued Sept. 11, 1855

H. PETERS, Photo-Lithographer, Washington, D. C.

UNITED STATES PATENT OFFICE.

JOHN MASSEY, OF NEW YORK, N. Y.

IMPROVEMENT IN GRAIN-DRIERS.

Specification forming part of Letters Patent No. 6,322, dated April 17, 1849; Reissue No. 328, dated September 11, 1855.

*To all whom it may concern:*

Be it known that I, JOHN MASSEY, of the city, county, and State of New York, have invented a new and useful Improvement in Grain Driers, of which the following is a full, clear, and exact description, reference being had to the accompanying drawings, making part of this specification, in which—

Figure 1:
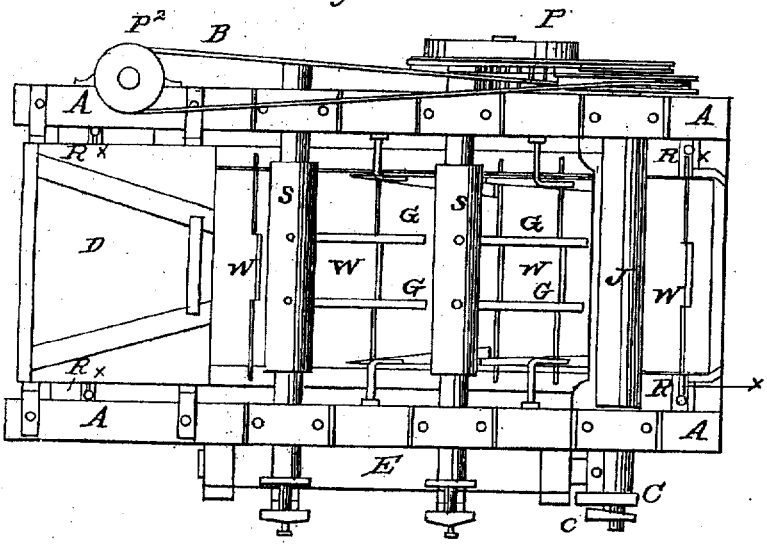
Figure 2:
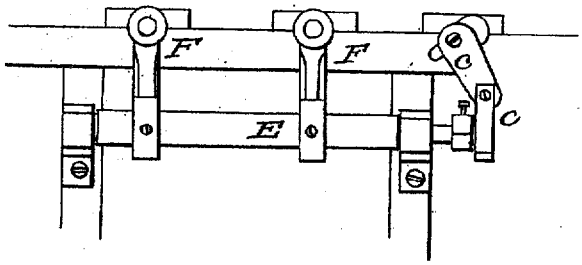
Figure 3:
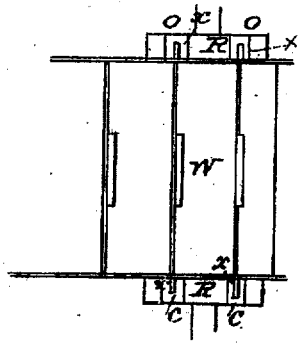
Figure 4:
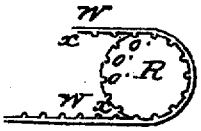

Figure 1 is a plan with the top of the heating-chamber removed; Fig. 2, a longitudinal vertical section taken at the line A *a* of Fig. 1; and Fig. 3, a cross vertical section taken at the line B *b* of Fig. 1, and Fig. 4 is a side elevation with the side of the heating-chamber removed to exhibit the internal arrangement.

The same letters indicate like parts in all the figures.

In kiln-drying grain it is important that it should not be exposed to the action of the heat beyond the requisite time to thoroughly expel the moisture, and that this should be done regularly and with the view to economy with the least practical consumption of fuel.

To accomplish these important results the nature of my invention consists in combining with a suitable heating-chamber a moving endless metallic pan formed in links, that it may pass over or around drums, or equivalent devices at each end, so that by its continuous motion it may receive from a hopper or other feeder a continuous supply of grain spread evenly over its surface, and deliver it in a thoroughly dried state at the other end of the said heating-chamber, the motion of the said endless pan or apron being duly proportioned and regulated according to the temperature of the heating-chamber and the degree of moisture in the grain.

In the accompanying drawings, *a* represents a chamber with suitable doors or lids and other apertures to constitute it a heating-chamber, within which is placed a furnace, *b*, with circulating-flues leading to the chimney *c*, and exposing a large amount of heating-surface to heat the air in the chamber, and the grain by radiation and conduction. Within this chamber is placed, and properly secured, a suitable frame, *d*, for the support of the mechanism. At the ends of this frame are mounted two horizontal shafts, *e e*, each carrying an octagonal drum, *f*, around which passes the endless pan or apron *g*. This pan is made of sheet metal in sections corresponding in size with the faces of the drums. The edges of the several sections are formed with knuckle-joint hinges *h h*, which are united by round metallic rods passing through, and the drums are grooved at the several angles to receive the hinges, which project from the inner surface of the pan. The ends of the several sections are turned up, as at *i i*, to form a continuous flange on each edge, where it is drawn in a straight line between the drums, and at the same time admit of passing around them, thus constituting the apron and endless pan to hold the grain.

Motion is applied by any suitable motor to the shaft of one of the octagonal drums, which causes the endless pan to travel by a continuous motion in the direction of the arrow, the other drum being carried by the endless pan or apron.

The grain to be dried is supplied through a hole in the top of the surrounding chamber to a hopper, *j*, the front end of which is a sliding board to increase or decrease the size of the delivery-aperture from which the grain is delivered regularly onto the pan as it passes under the open edge thereof. This hopper is suspended by straps *k k* from the frame, and it receives a shaking motion, to insure the regular delivery of the grain, by a joint-link, *l*, from a crank, *m*, on a small vertical shaft, *n*, which is rotated by bands and pulleys *o o p p q q*. As the grain is carried along from the hopper in a thin stratum on the bottom of the pan, it is thoroughly dried by the heated atmosphere within the kiln, and drops at the opposite end onto an inclined chute, *r*, extending through the casing or wall of the heating-chamber.

During the travel of the grain from the hopper to the end where it is discharged it is gently stirred or raked by rakes, which consists of wires *s s*, projecting from shafts *t t*, the journals of which are free to turn and slide in suitable boxes, *u u v v*, on the frame, and as the wires constituting the rakes are inclined their lower ends rest on the bottom of the pan by gravity, so that in case of meeting any obstruction they will be free to rise and pass over it. The ends of the rake-shafts are grooved, as at *v' v'*, and embraced by the upper end of arms *w w* on a rockingshaft, *x*, which is vibrated by a connection-rod, *y*, one end of which is connected with a wrist pin on an arm, *z*, of the rocker, and the other with a crank, *a'*, on the end of a horizontal shaft, *b'*, which receives motion by the band *o* from the shaft of one of the drums. By these means the rakes are made to vibrate with a slow motion across the surface of the endless pan, and thus gently to stir the grain as it is being dried.

From the foregoing it will be seen that as the grain is delivered regularly onto the pan and spread on the bottom thereof it is moved along regularly and heated by the atmosphere within the heating-chamber, and by the pan, which, being of metal, will itself be heated and transfer that heat to the grain; that the grain will be regularly and continuously received, dried, and delivered, and as the temperature of the heating-chamber or the amount of moisture in the grain varies, that this can be readily compensated by increasing or decreasing the velocity of the endless pan; and it will also be obvious that by making the endless pan of sheet metal it will not only act as a conductor to impart to the grain all the heat it receives, but that it will not be injured by the heat. The apparatus, being made of metal, will be secure against all accidents from fire, which is necessarily used in kiln-drying grain.

And although I have specified a mode of heating the chamber which incloses the mechanism, and have described and represented the mode of constructing and imparting motion to the endless pan or apron, and the hopper for supplying the grain, and the rakes for stirring it in its progress through the heating-chamber, I do not wish to be understood as limiting my claim to such mode of heating, nor to such mode of constructing and imparting motion, as the same ends may be attained by equivalent means having substantially the same mode of operation.

What I claim as my invention, and desire to secure by Letters Patent in the method of kiln-drying grain, is—

The employment of an endless pan or apron made of metal and passing around drums, or the equivalents thereof, substantially as specified, in combination with and operated within a heating-chamber, substantially as set forth.

JOHN MASSEY.

Witnesses:
WM. H. BISHOP,
ANDREW DE LACY.

THE DRAWING IN THIS PATENT IS NOT IN PRINT.